(12) United States Patent
Wu et al.

(10) Patent No.: US 11,809,371 B2
(45) Date of Patent: Nov. 7, 2023

(54) METHOD, APPARATUS, ELECTRONIC DEVICE, AND MEDIUM FOR FILE MANAGEMENT

(71) Applicant: Dell Products L.P., Round Rock, TX (US)

(72) Inventors: Andy Ling Wu, Shanghai (CN); Xingjun Lv, Wuxi (CN); Roland Fei Sun, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/699,003

(22) Filed: Mar. 18, 2022

(65) Prior Publication Data

US 2023/0229626 A1    Jul. 20, 2023

(30) Foreign Application Priority Data

Jan. 19, 2022   (CN) .......................... 202210061849.4

(51) Int. Cl.
*G06F 7/00* (2006.01)
*G06F 16/11* (2019.01)
*G06F 16/901* (2019.01)

(52) U.S. Cl.
CPC ........ *G06F 16/122* (2019.01); *G06F 16/9017* (2019.01)

(58) Field of Classification Search
CPC .. G06F 16/122; G06F 16/9017; G06F 16/172; G06F 11/3688; G06F 16/2228; G06F 16/2358
USPC ....... 707/639, 673, 705, 711, 715, 822, 825, 707/829, 737, 741, 727
See application file for complete search history.

(56) References Cited

U.S. PATENT DOCUMENTS

| | | | |
|---|---|---|---|
| 8,204,871 B1 * | 6/2012 | Pawar | G06F 16/172 707/711 |
| 9,471,595 B1 * | 10/2016 | Vempati | G06F 12/00 |

\* cited by examiner

*Primary Examiner* — Md I Uddin
(74) *Attorney, Agent, or Firm* — Amin, Turocy & Watson, LLP

(57) ABSTRACT

File management is enabled for large numbers of files. Example file management includes setting a grouping identifier for a file. The method further includes determining a storage address of a data block of the file, the storage address indicating an extent where the data block is located and an offset. The method further includes setting, in a storage region of the extent corresponding to the grouping identifier, a flag for the data block based on the offset. In this manner, a large number of files in a distributed file system can be managed more efficiently.

20 Claims, 4 Drawing Sheets

METHOD, APPARATUS, ELECTRONIC DEVICE, AND MEDIUM FOR FILE MANAGEMENT

RELATED APPLICATION

The present application claims the benefit of priority to Chinese Patent Application No. 202210061849.4, filed on Jan. 19, 2022, which application is hereby incorporated into the present application by reference herein in its entirety.

TECHNICAL FIELD

Embodiments of the present disclosure relate to the field of computers, and more particularly, to a storage system. Embodiments of the present disclosure provide a method, an apparatus, an electronic device, a medium, and a computer program product for file management.

BACKGROUND

A large number of files are stored in a storage system. Typically, tens of thousands of files or more may be stored in one directory. In some application scenarios, batch processing of a large number of files is required, which will consume a lot of computational resources. This is because storage addresses of data blocks of these files need to be acquired from metadata of the files, then can the data blocks be operated. This approach takes a long time to complete and is difficult to meet business needs. Therefore, there is a need for an efficient solution to manage a large number of files in a storage system.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

According to a first aspect of the present disclosure, a method for file management is provided. The method includes setting a grouping identifier for a file. The method further includes determining a storage address of a data block of the file, the storage address indicating an extent where the data block is located and an offset. The method further includes setting, in a storage region of the extent corresponding to the grouping identifier, a flag for the data block based on the offset.

According to a second aspect of the present disclosure, an apparatus for file management is further provided. The apparatus includes a grouping unit, an address determination unit, and a flagging unit. The grouping unit is configured to set a grouping identifier for a file. The address determination unit is configured to determine a storage address of a data block of the file, the storage address indicating an extent where the data block is located and an offset. The flagging unit is configured to set, in a storage region of the extent corresponding to the grouping identifier, a flag for the data block based on the offset.

According to a third aspect of the present disclosure, an electronic device is provided. The electronic device includes at least one processing unit and at least one memory. The at least one memory is coupled to the at least one processing unit and stores instructions for execution by the at least one processing unit, wherein the instructions, when executed by the at least one processing unit, cause the electronic device to perform the method according to the first aspect of the present disclosure.

According to a fourth aspect of the present disclosure, a computer-readable storage medium is provided, which includes machine-executable instructions which, when executed by a device, cause the device to perform the method according to the first aspect of the present disclosure.

According to a fifth aspect of the present disclosure, a computer program product is provided. The computer program product is tangibly stored on a computer-readable medium and includes machine-executable instructions which, when executed by a device, cause the device to perform the method according to the first aspect.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which.

DETAILED DESCRIPTION

Figure 1:
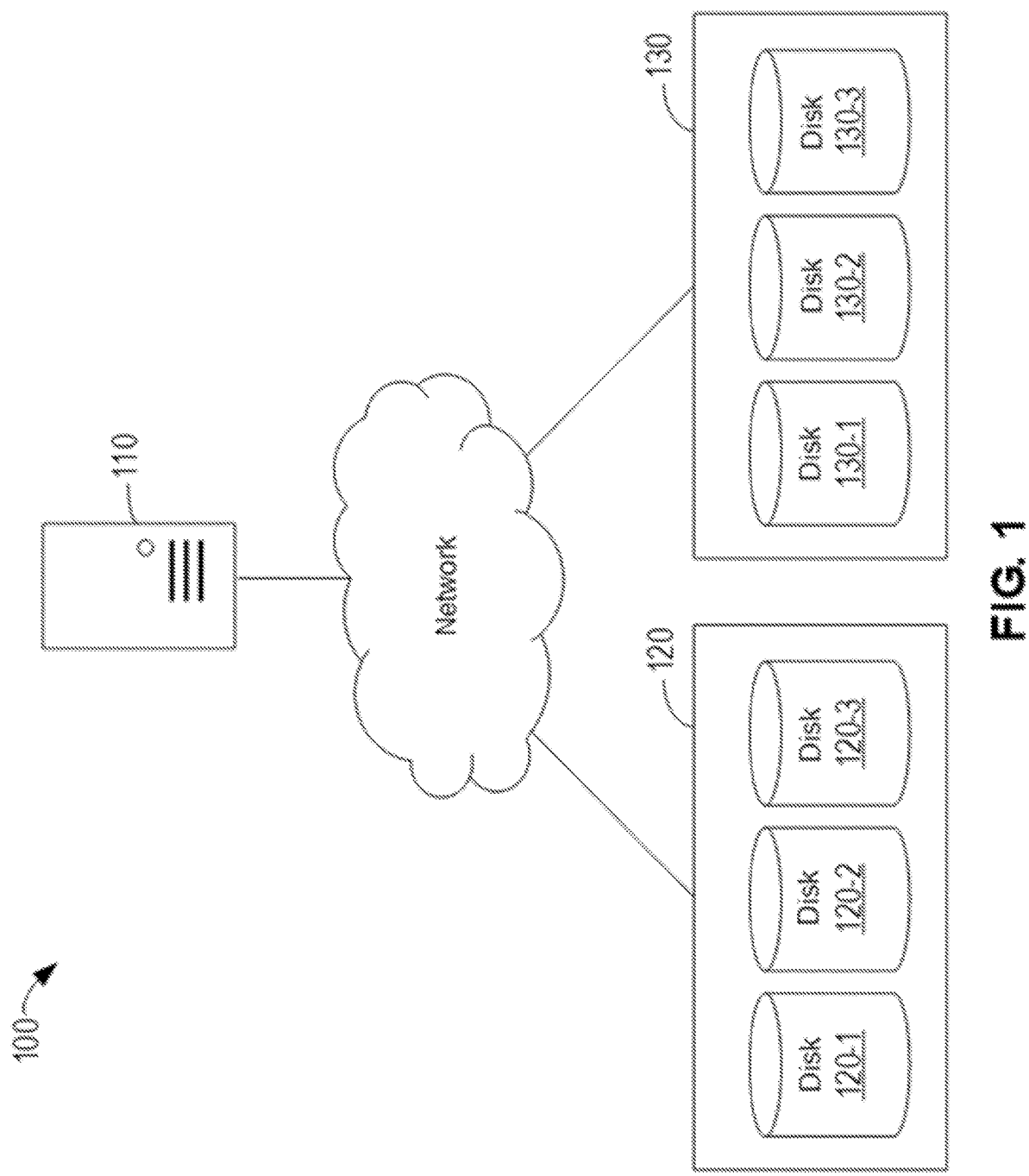
FIG. 1 illustrates a block diagram of an example environment according to some embodiments of the present disclosure.

Embodiments of the present disclosure will be described in more detail below with reference to the accompanying drawings. Although the drawings show certain embodiments of the present disclosure, it should be understood that the present disclosure can be implemented in various forms and should not be interpreted as being limited by the embodiments described herein. Instead, these embodiments are provided to enable a more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or the same objects. Other explicit and implicit definitions may also be included below.

In addition, all specific values herein are examples intended only to aid understanding and are not intended to limit the scope.

As described above, a large number of files are stored in a storage system. When batch processing of these files is required, a processor needs to access metadata of these files and find storage locations of data blocks of the files before operating the data blocks of the files. However, accessing metadata of files one by one will consume a large amount of computational resources, and since data blocks of the files are distributed in a storage system, operating these data blocks will introduce a large number of scattered inputs/outputs (I/O) on a storage device, which also degrades the performance of the storage system.

One known solution uses asynchronous threads to perform batch operations on files in the backend. However, this approach is difficult to complete in a short time. For example, when storage space of the storage system is insufficient and it is necessary to delete a large number of expired files to make room, the deletion operation may last for several hours or even longer.

Embodiments of the present disclosure provide a solution for file management. According to embodiments of the present disclosure, files are divided into groups (which may also be referred to as "domains") by setting grouping identifiers for the files, and a storage region is set in an extent for each group. The storage region has flags for data blocks in the extent. In other words, the flag set in each storage region indicates that the file to which the data block at the corresponding offset belongs is set in a corresponding group. Thus, the grouping management of files can be achieved by means of these flags.

As will be understood from the following description, compared with known conventional solutions, the solution according to the embodiments of the present disclosure uses the flags already set in the extent of the storage system to perform batch operations on a large number of files in the storage system according to grouping identifiers without accessing metadata of the files, thereby saving computational resources and improving management efficiency.

Some example embodiments of the present disclosure will be described below with continued reference to the accompanying drawings.

FIG. 1 illustrates a block diagram of example environment 100 according to some embodiments of the present disclosure. As shown in FIG. 1, example environment 100 may generally involve a distributed storage system. In some embodiments, example environment 100 includes electronic device 100 and storage nodes 120 and 130 connected to each other via a network.

Electronic device 110 may be a device with a computing capability such as a personal computer, a workstation, a server, etc. The scope of the present disclosure is not limited in this regard. In some embodiments, electronic device 110 may access or operate files stored on storage nodes 120 and 130 via the network, for example, to create new files, read files, write files, delete files, migrate files, etc. Herein, files may also include directories in the storage system.

Storage nodes 120 and 130 may include clusters of storage devices such as disk arrays. As shown in FIG. 1, storage node 120 includes a plurality of disks 120-1, 120-2, 120-3, etc., and storage node 130 includes a plurality of disks 130-1, 130-2, 130-3, etc. In example environment 100 such as a distributed storage system, storage nodes 120 and 130 may be geographically distant from each other and may collectively provide a uniform storage address space with the aid of management software or hardware of the distributed storage system. It should be understood that environment 100 may include more or fewer storage nodes, and storage nodes 120 or 130 may include more or fewer disks. The scope of the present disclosure is not limited in this regard.

A file may be divided into data blocks, and the data blocks may be stored in a scattered way across the disks of storage nodes 120 and 130. To manage the files, metadata, such as an Mode (also referred to as an index node), is provided. The metadata may record the number of bytes of the file, an identifier of the owner of the file, read, write, and execute permissions of the file, a time stamp of the file, and storage addresses of the data blocks of the file. In a distributed storage system, the storage address indicates a storage node or an extent where a data block is located, an offset, etc. For example, the storage node may be indicated by a node identifier (ID), the extent may be indicated by a disk identifier, and the offset may be indicated by the number of blocks on the extent relative to the start of the disk for that data block.

Although example environment 100 is illustrated as a distributed storage system, embodiments of the present disclosure may be implemented in different environments. For example, embodiments of the present disclosure may be implemented in an environment including a single disk or a single storage node.

Figure 2:
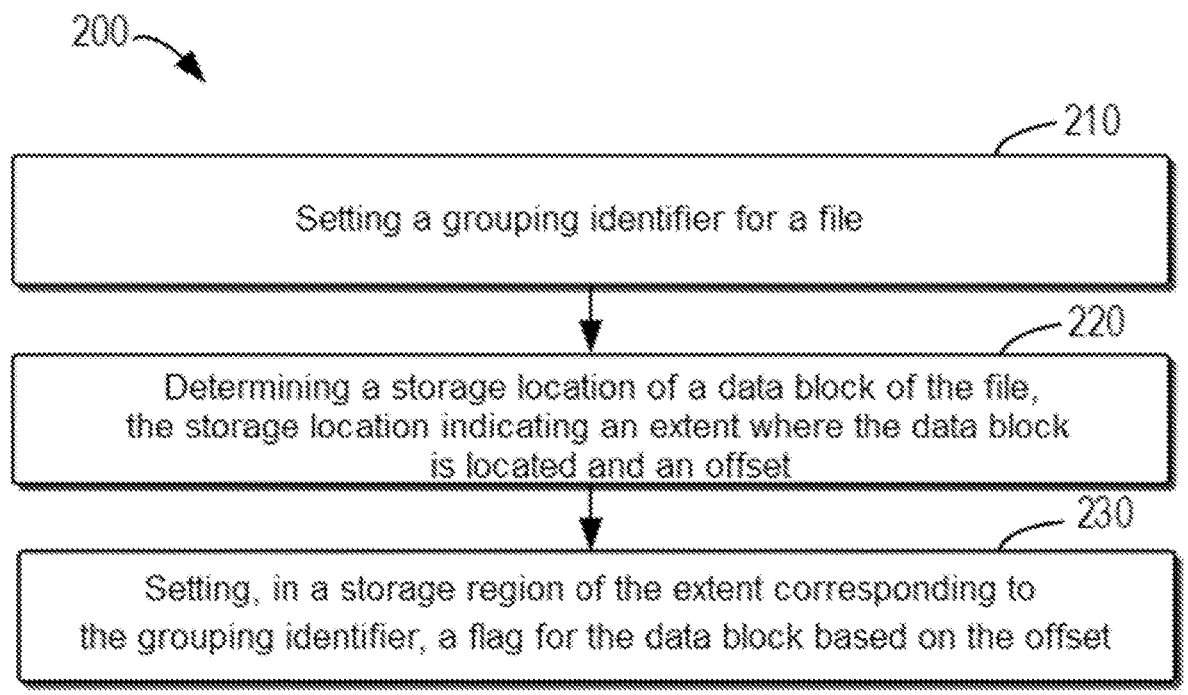
FIG. 2 illustrates a schematic flow chart of a method for file management according to some embodiments of the present disclosure.

FIG. 2 illustrates a schematic flow chart of method 200 for file management according to some embodiments of the present disclosure. Method 200 may be implemented by, for example, electronic device 110 of FIG. 1.

At block 210, electronic device 110 sets a grouping identifier for a file. The grouping identifier may also be referred to as domain identifier. The grouping identifier may be represented by a number, for example, one of 0 to 7 (3 bits are required for binary form). In some embodiments, the action of setting the grouping identifier may be manually triggered or automatically triggered. For example, a user may wish to delete all files in a directory in the future, then the user may set a grouping identifier for that directory, and such action may be referred to as "grouping." Accordingly, the files in that directory (and their snapshots) are automatically set with the same grouping identifier. Alternatively, if a directory has not been updated for more than a certain period of time, electronic device 110 may automatically trigger the setting of a grouping identifier for that directory in preparation for an actual deletion operation to be performed in the future. It should be understood that setting a grouping identifier for files is not limited to setting the same grouping identifier for files in the same directory, and the grouping identifier is not necessarily used to delete files, but may also be used for other purposes. The scope of the present disclosure is not limited in this regard.

In some embodiments, the grouping identifier may be set in metadata of a file. As described above, a file has corresponding metadata, which stores basic information about the file, such as size, access permission, storage addresses of data blocks, etc. Thus, the metadata also includes the grouping identifier of the file for subsequent access and use.

The data blocks of metadata are stored in the storage system just like general data blocks. For example, the storage address of the metadata indicates the storage node and extent where the metadata is located, an offset, etc. In some embodiments, the storage unit for storing general data may be a block of 8K bytes on an extent, while the storage unit for storing metadata may be a 512-byte region on an extent. This is because metadata is typically small and storing it in a 512-byte region can save storage space.

In some embodiments, a mapping table is also provided for the correspondence between files and storage addresses of their metadata. The mapping table may be implemented in the form of a B-tree or other data structures. For a distributed storage system, the mapping table may also be referred to as a logical Mode (LIN) tree. The mapping table is used when a file is opened. The mapping table includes an entry having the identifier (which may also be referred to as a "logical Mode" or LIN) of a file and the storage address of its metadata. In some embodiments, the file identifier may be represented by 8 bytes, i.e., 64 bits. Once a file is created, its identifier is determined and cannot be changed. In a storage system, even if a file is deleted, its identifier may no longer be used by any other file. As described above, the storage address of metadata indicates the storage node and extent where the metadata is located and an offset.

In some embodiments, the grouping identifier may be set in metadata of a file. Specifically, electronic device 110 may determine a metadata address corresponding to an identifier of a file based on the mapping table, and then set a grouping identifier in the metadata based on that metadata address.

In some embodiments, the grouping identifier may be set based on a directory where the file is located, so that all files in the same directory are set to have the same grouping identifier. That is, all files (including existing files and future files) under the same directory are grouped into one group for management.

Suppose that any one of 1 to 7 may be selected as the grouping identifier. For example, if a directory is set to have a specific grouping identifier, such as "3," then all existing files in that directory may be set to have the grouping identifier "3," and new files created in the future in that directory will automatically be set to have the grouping identifier "3." This is advantageous because files in the entire directory may be processed together through the same grouping identifier, as described in more detail below.

In addition, in some embodiments, if the grouping identifier is used to delete the directory at a later time, creating references outside that directory to that directory or files within that directory may be prevented, the reason being that at some future time, the directory or the files within the directory will be deleted, causing the corresponding references to become invalid.

With continued reference to FIG. 2, at block 220, electronic device 110 determines a storage address of a data block of the file, the storage address indicating an extent where the data block is located and an offset. In some embodiments, the actions of determining the storage address of the data block of the file and subsequently setting a flag at block 230 may be manually triggered by a user or automatically triggered, which may be collectively referred to as "flagging."

Hereinafter, the grouping identifier "3" will be taken as an example for illustration. Electronic device 110 traverses metadata of all files in one directory of the storage system to find the files with the grouping identifier "3" and storage addresses of data blocks of those files. Data blocks of a file may include data blocks of metadata of the file as well as data blocks of general data of the file. To this end, electronic device 110 may first access a mapping table to acquire a storage address of a data block of metadata, then access the metadata at that address, and determine a storage address of a general data block of the file based on the data block address information in the metadata.

As described above, for a distributed storage system, the storage address of a data block indicates the storage node and extent where the data block is located and an offset. For a storage system that includes a single disk or a single storage node, the storage address may not indicate the storage node.

The extent may be a cylinder group (CG) of a disk. In a storage system, a disk is divided into one or more regions called cylinder groups, where a cylinder group consists of one or more contiguous cylinders at the same distance from the center of the disk. For example, a cylinder group may have 32 M of storage space, which includes 4096 blocks of 8K bytes. A block in a cylinder group has a corresponding offset relative to the start of the cylinder group. Thus, the extent and the offset indicated by the storage address uniquely indicate the location where a data block of the file is located.

For ease of illustration, the layout of an extent will be further described with reference to Table 1.

TABLE 1

Example Extent Layout

| Offset | CG0 |
| --- | --- |
| 0 | Startup block |
| 1 | Superblock |
| 2 | Backup superblock |
| 3 | Allocation status block |
| 4 | Sweep block |
| 5-39 | Reserved block |
| 40-46 | Grouping flag block |
| 47-4095 | Data block |

Table 1 illustrates an example extent layout. The above cylinder group will be taken as an example of the extent for illustration. In a cylinder group (e.g., in CG 0), the block with an offset of 0 is the startup block, the block with an offset of 1 is the superblock, and the block with an offset of 2 is the backup superblock. These blocks are used to store basic information about the extent, such as the size of each block, how many pieces of metadata are in the extent, etc.

The block with an offset of 3 is called the allocation status block, and the allocation status block has 8K bytes. The bits in the allocation status block may be mapped to blocks or part of blocks in the cylinder group itself and are used to indicate the status of the corresponding blocks or part of blocks, e.g., allocated status (e.g., value being 1) or idle status (value being 0). As an example, in the extent, if the value of a bit in the allocation status block corresponding to a block is 1, it means that the block is already allocated for use, i.e., it belongs to a file, while if the value of the corresponding bit is 0, it means that the block is in an idle status and may be allocated for use by a newly created file. Here, 1 is used to indicate the allocated status, 0 is used to indicate the idle status, and it should be understood that the opposite configuration is also possible.

It should be noted that the allocation status block includes 8K*8=64K bits, while the cylinder group includes 4K data blocks, each data block having a size of 8K bytes. Depending on the granularity of the correspondence, one bit in the allocation status block may be used to indicate the allocation status of a 512-byte (thus, 4K*8K/512=64K) storage space in the extent. As described above, the granularity of a 512-bytes size is applicable to the case of metadata storage. It should be understood that for larger granularity (e.g., general data), an allocation status block including 8K bytes is sufficient. Based on the above analysis, it can be seen that a block of 8K is sufficient to represent and manage the status of all blocks in the extent.

The sweep block with an offset of 4 may be used to discover and sweep unused storage space in the storage space. In some embodiments, electronic device 110 first sets the sweep block all to 0, then determines the storage locations of the data blocks of the file by accessing the metadata of the file, and sets the corresponding bits in the sweep block to 1. That is, after traversing all the files in the storage system, the blocks of which the corresponding bits in the sweep block are still 0 do not belong to any file, so the bits in the corresponding allocation status blocks may be set to indicate idle (value 0). Simply, the sweep block may be copied to the allocation status block, thus achieving the sweeping of storage space in the extent.

Blocks with offsets of 5-39 are reserved blocks and may be used to expand other functions in the future.

Blocks with offsets of 40-46 are referred to as grouping flag blocks. Specifically, a block with an offset of 40 in the extent may be used to store a flag for a data block in the extent associated with a first grouping identifier (e.g., grouping identifier being "1"), and a block with an offset of 41 may be used to store a flag for a data block associated with a second grouping identifier (e.g., grouping identifier being "2"), a block with an offset of 42 may be used to store a flag for a data block associated with a second grouping identifier (e.g., grouping identifier being "3"), and so on. The flag may be binary 0 or 1.

With continued reference to FIG. 2, at block 230, in a storage region of the extent corresponding to the grouping identifier, a flag corresponding to the data block is set based on the offset. As described above, the extent and offset of the data block of the file with the grouping identifier "3" have been obtained at block 220. Therefore, at least one bit in the storage region (i.e., the block with an offset of 42) corresponding to the offset of the data block may be set as the corresponding flag, for example, set as "1." For example, a file is set with grouping identifier "3," and the offsets of its data blocks in the extent range from 4000 to 4095. In this case, the last 96*2 bytes of the block with an offset of 42 (the 2 bytes in the grouping flag block correspond to one of the data blocks 47 to 4095) may all be set as "1." It should be understood that the above flagging method is only an example, and other flagging methods may also be used. For example, the flagged bits may be "0" or a combination of other values.

In some embodiments, the grouping identifier may be synchronized to the mapping table of file identifiers and metadata addresses mentioned above. In some embodiments, for an entry of a file in the mapping table, the grouping identifier may be set in the reserved data structure for the file, as follows:

```
struct lin_entry_flags {
    struct btree_flags btree_flags[0];
    uint8_t needs_repair : 1;
    uint8_t is_minisnap : 1;
    uint8_t to_be_deleted : 3;    //new assigned bits
    uint8_t unused : 1;
    uint8_t ignored : 2;
}
```

Here, the variable "to_be_deleted" includes 3 bits that indicate the grouping identifier set for the file, and its value ranges from 0 to 7 (2^3−1). Thus, the grouping identifier is recorded synchronously in the metadata of the file and in the mapping table of the storage system.

In some embodiments, the grouping identifier recorded in the mapping table may be used to control access to the file. Specifically, in response to receiving a request to access a file, the mapping table may be searched, and the access request may be rejected if the value of the grouping identifier recorded in the entry related to the file in the mapping table, i.e., the variable "to_be_deleted," is any of values 1 to 7. If the value of the variable "to_be_deleted" of the file in the mapping table is 0, it means that the file does not belong to the files to be deleted, and access to the file is allowed. It should be understood that "to_be_deleted" is only an example name of grouping identifier. Depending on the specific application, the grouping identifier may be used for various purposes and is not limited to deleting files. For example, it may also be used to hide from a user a file in the mapping table of which the grouping identifier is set to a specified value.

In some embodiments, after the bits in the grouping flag block are set, the grouping flag block may be updated if a data block of a new file belonging to that grouping identifier is newly allocated in the extent or if the original file is deleted. Therefore, in response to allocating a data block of another file in the extent, a flag for the data block is set in a storage region of the extent corresponding to a grouping identifier of the other file. In addition, in response to releasing a data block of another file in the extent, a flag for the released data block is cleared in a storage region of the extent corresponding to a grouping identifier of the other file.

Once the grouping flag block is set, it may be used to efficiently manage a large number of files on the extent without accessing metadata of the files. An application example of batch file deletion will be described below with reference to FIG. 3.

Figure 3:
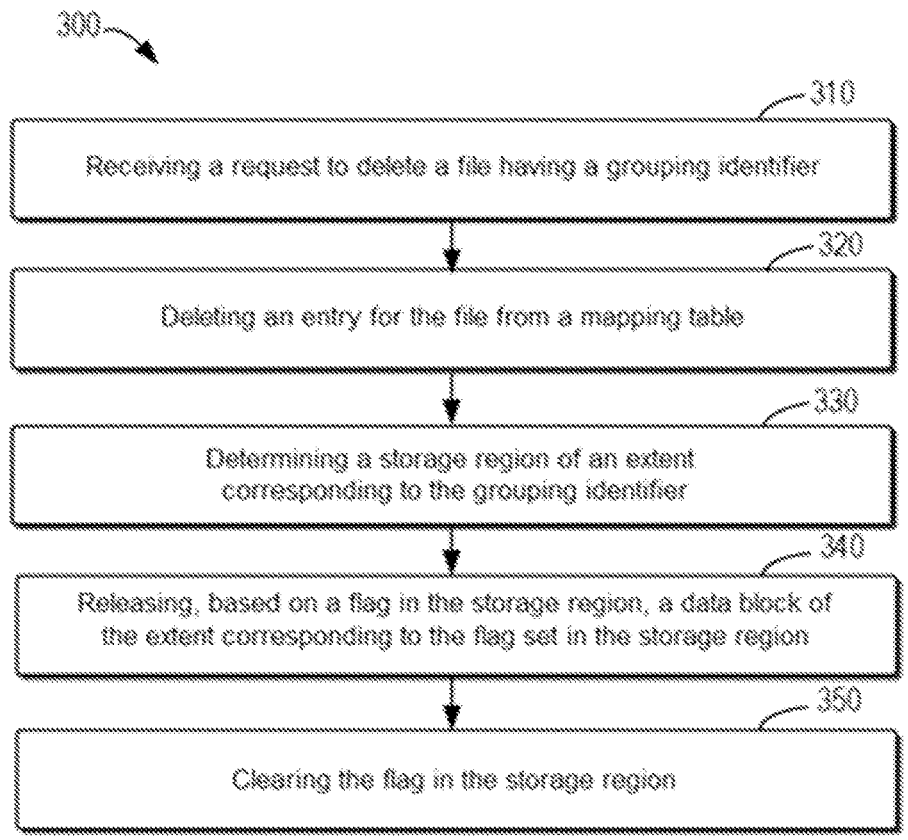
FIG. 3 illustrates a schematic flow chart of a method for deleting a file in a storage system according to some embodiments of the present disclosure.

FIG. 3 illustrates a schematic flow chart of method 300 for deleting a file in a storage system according to some embodiments of the present disclosure. Method 300 may be implemented by, for example, electronic device 110 of FIG. 1.

At block 310, electronic device 110 receives a request to delete a file having a grouping identifier. For example, electronic device 110 receives a request to delete all files in a specified directory on the storage system that is triggered manually by a user or triggered automatically, and the directory and all files within the directory have been set with that grouping identifier.

At block 320, electronic device 110 deletes an entry for the file having that grouping identifier from the mapping table having metadata addresses. For example, for a request to delete a directory, electronic device 110 may remove from a mapping table of, for example, a tree structure, the link of the directory to the tree.

At block 330, electronic device 110 determines a storage region of the extent corresponding to that grouping identifier. In response to the request to delete files, electronic device 110 may traverse various extents of the storage system to remove data blocks for those files from each extent. Continuing with the example of grouping identifier "3." Electronic device 110 determines the storage region of each extent corresponding to that grouping identifier, i.e., the block with an offset of 42.

At block 340, electronic device 110 releases, based on the flag in the storage region, data blocks of the extent corresponding to the flag set in the storage region. In some embodiments, these data blocks are released by updating the allocation status block (the block with an offset of 3 in Table 1) of the extent. For example, a block with an offset of 42 is aligned with the allocation status block of the extent such that the bit in the allocation status block that is aligned with the set flag is updated to indicate the idle status.

At block 350, electronic device 110 clears the flag in the storage region. For example, electronic device 110 sets all bits of the block with an offset of 42 as 0, indicating that there are no data blocks in the extent belonging to the file with grouping identifier 3. In this way, the batch file deletion is completed.

According to the method described with reference to FIG. 3, a large number of files in a directory can be deleted more efficiently. For example, a directory is created for a short-term project, and the directory will be deleted one day after the project is completed. The user may set a to-be-deleted flag for all files during the life of the project, so that the directory can be deleted more efficiently and cost-effectively after the project is completed by simply triggering the process shown in FIG. 3.

As can be seen from the above description in conjunction with FIGS. 1 to 3, the solution according to the embodiments of the present disclosure uses flags already set in an extent of a storage system to perform batch operations on a large number of files in the storage system according to grouping identifiers without accessing metadata of the files, thereby saving computational resources and improving management efficiency.

As an additional advantage, according to the embodiments of the present disclosure, the process described above with reference to FIG. 2 may be imperceptible to a user until actual operations are performed on the files in the storage system. The user may normally read and write files or data blocks that have been set with grouping identifiers and set with flags in the extent. However, once actual operations have started, the metadata of the files may have been cleaned up or may be incorrect. In this case, the solution according to the embodiments of the present disclosure may determine to reject any operation for the files by accessing the grouping identifiers in the mapping table without accessing the metadata. In addition, after flagging, if the user does not intend to perform actual operations, it is possible to roll back by performing a process opposite to that described with reference to FIG. 2.

Figure 4:
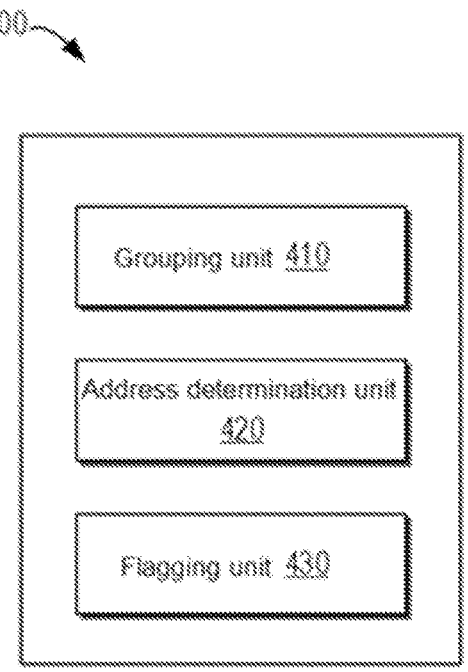
FIG. 4 illustrates a schematic block diagram of an apparatus for file management according to some embodiments of the present disclosure.

FIG. 4 illustrates a schematic block diagram of apparatus 400 for file management according to some embodiments of the present disclosure. Apparatus 400 includes grouping unit 410, address determination unit 420, and flagging unit 430. Apparatus 400 may be implemented in electronic device 110 as shown in FIG. 1.

Grouping unit 410 is configured to set a grouping identifier for a file. In some embodiments, the grouping unit may also be configured to determine the grouping identifier for the file based on a directory in which the file is located such that files in the directory have the same grouping identifier. In addition, grouping unit 410 may also be configured to prevent the creation of references outside the directory to the directory or to a file within the directory.

Address determination unit 420 is configured to determine a storage address of a data block of the file, the storage address indicating an extent where the data block is located and an offset. In some embodiments, the address determination unit may also be configured to determine a storage address of at least one data block of the file based on metadata of the file.

Flagging unit 430 is configured to set, in a storage region of the extent corresponding to the grouping identifier, a flag for the data block based on the offset. In some embodiments, the flagging unit may also be configured to set at least one bit in the storage region corresponding to the offset as the flag. The flag may be a binary value, such as 0 or 1.

In some embodiments, grouping unit 410 may also be configured to determine a metadata address of the file based on a mapping table including metadata addresses of files; and set the grouping identifier in metadata of the file based on the metadata address. In some embodiments, flagging unit 430 may also be configured to set the grouping identifier for the file in the mapping table.

In some embodiments, apparatus 400 may further include an access control unit (not shown), where the access control unit may be configured to receive a request for access to the file; and reject the request in response to that the file has been set with the grouping identifier in the mapping table.

In some embodiments, flagging unit 430 may also be configured to set, in response to allocating a data block of another file in the extent, a flag for the data block in a storage region of the extent corresponding to a grouping identifier of the another file; or clear, in response to releasing a data block of another file in the extent, a flag for the released data block in a storage region of the extent corresponding to a grouping identifier of the another file.

In some embodiments, apparatus 400 may also include a deletion unit (not shown), where the deletion unit is configured to receive a request to delete a file having the grouping identifier; determine a storage region of the extent corresponding to the grouping identifier; release, based on the flag in the storage region, a data block of the extent corresponding to the flag set in the storage region; and clear the flag in the storage region.

In some embodiments, the extent may be a cylinder group of a disk.

Figure 5:
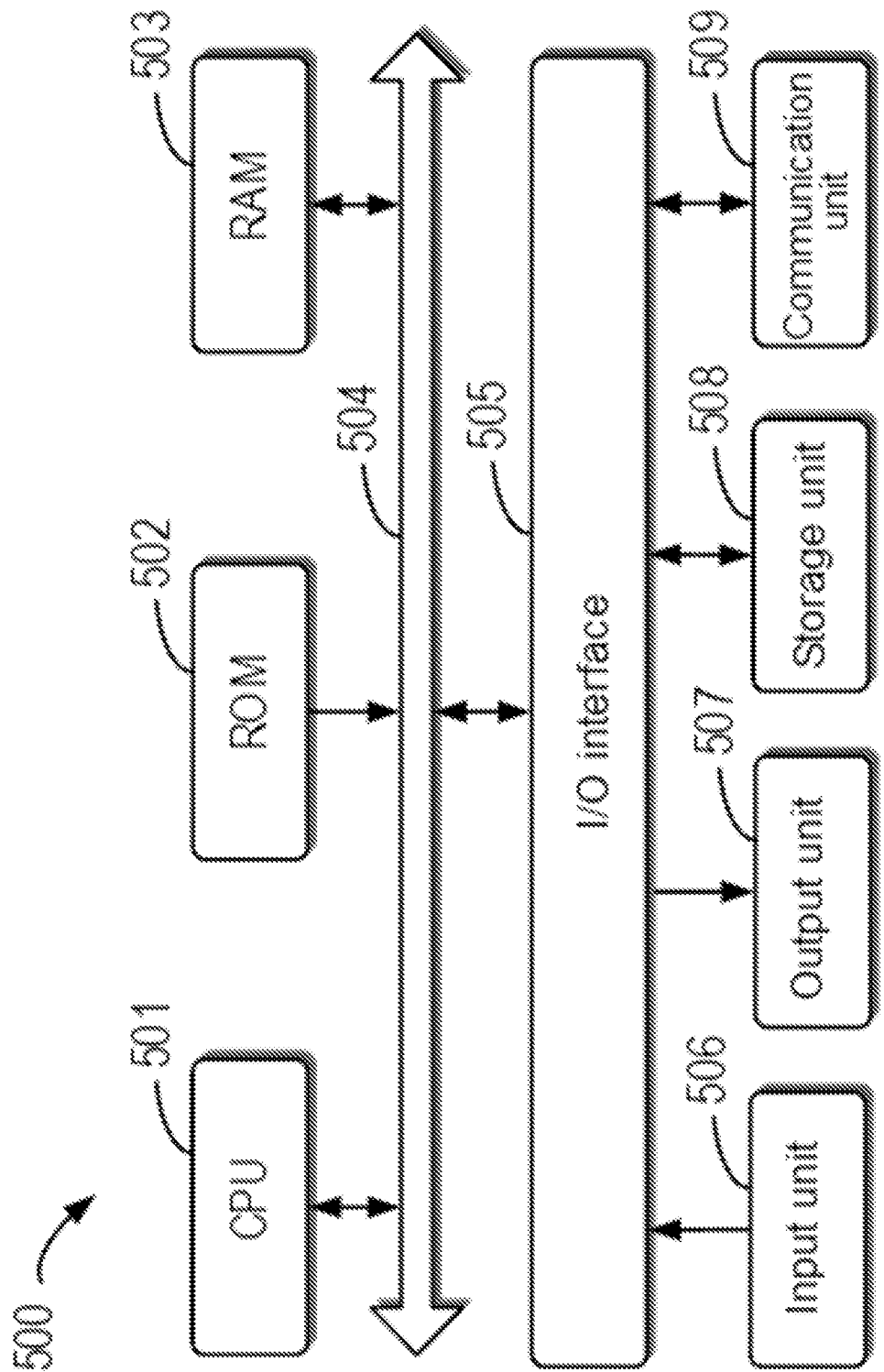
FIG. 5 illustrates a schematic block diagram of an example device that may be used to implement some embodiments of the present disclosure.

FIG. 5 illustrates a schematic block diagram of example device 500 that may be used to implement some embodiments of the present disclosure. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for the operation of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various methods and processes described above, such as methods 200 and 300, may be performed by processing unit 501. For example, in some embodiments, methods 200 and 300 may be implemented as a computer software program that is tangibly included in a machine-readable medium, such as storage unit 508. In some embodiments, part of or all the computer program may be loaded and/or installed to device 500 via ROM 502 and/or communication unit 509. When the computer program is loaded to RAM 503 and executed by CPU 501, one or more actions in methods 200 and 300 described above can be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus, the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

What is claimed is:

1. A method, comprising:
    setting, by a file management system comprising a processor, from a set of grouping identifiers, a grouping identifier for a file in metadata of the file based on the metadata address, wherein the setting the grouping identifier is automatically triggered based on a first criterion;
    determining, by the file management system, a storage address of a data block of the file, the storage address indicating an extent of the data block and an offset, wherein the extent is a cylinder group of a disk and comprises a storage region comprising respective grouping flag blocks for grouping identifiers of the set of grouping identifiers, and wherein the cylinder group includes one or more contiguous cylinders;
    setting, by the file management system, in a grouping flag block corresponding to the grouping identifier, a flag for the data block based on the offset, wherein setting the flag is automatically triggered based on a second criterion;
    receiving a request to delete a specified file having the grouping identifier;
    determining the grouping flag block of the extent corresponding to the grouping identifier;
    releasing, based on the flag in the grouping flag block, a data block of the extent corresponding to the flag set in the grouping flag block; and
    clearing the flag in the grouping flag block.

2. The method according to claim 1, wherein the setting of the grouping identifier for the file comprises:
    determining the grouping identifier for the file based on a directory in which the file is located, with a result that files in the directory have the same grouping identifier.

3. The method according to claim 2, further comprising:
    preventing creation of references outside the directory to the directory or to any file within the directory.

4. The method according to claim 1, wherein the determining of the storage address of the data block of the file comprises:
    determining the storage address of at least one data block of the file based on the metadata of the file.

5. The method according to claim 1, wherein the setting of the flag for the data block based on the offset comprises:
    setting at least one bit in the grouping flag block as the flag.

6. The method according to claim 1, wherein the setting of the grouping identifier for the file comprises:
    determining a metadata address of the file based on a mapping table comprising metadata addresses of files; and
    setting the grouping identifier in the metadata of the file based on the metadata address.

7. The method according to claim 1, wherein the data block of the file is a first data block, and further comprising at least one of:
    setting, in response to allocating another data block of another file in the extent, another flag for the other data block in another grouping flag block of the extent corresponding to another grouping identifier of the other file; or
    clearing, in response to releasing the other data block of the other file in the extent resulting in a released data block, the other flag for the released data block in the other grouping flag block of the extent corresponding to the other grouping identifier of the other file.

8. The method of claim 1, wherein the extent is a cylinder group of a disk.

9. An apparatus, comprising:
    a processor; and
    a memory that stores executable units that, when executed by the processor, facilitate performance of operations, comprising:
        a grouping unit configured to set, from a set of grouping identifiers, a grouping identifier for a file in metadata of the file based on the metadata address, wherein the setting the grouping identifier is automatically triggered based on a first criterion;
        an address determination unit configured to determine a storage address of a data block of the file, the storage address indicating an extent where the data block is located and an offset, wherein the extent is a cylinder group of a disk and comprises a storage region comprising respective grouping flag blocks for grouping identifiers of the set of grouping identifiers, and wherein the cylinder group includes one or more contiguous cylinders;
        a flagging unit configured to set, in a grouping flag block corresponding to the grouping identifier, a flag for the data block based on the offset, wherein setting the flag is automatically triggered based on a second criterion; and
        a deletion unit configured to:
            receive a request to delete an identified file having the grouping identifier;
            determine the grouping flag block of the extent corresponding to the grouping identifier;
            release, based on the flag in the grouping flag block, a data block of the extent corresponding to the flag set in the grouping flag block; and
            clear the flag in the grouping flag block.

10. The apparatus according to claim 9, wherein the grouping unit is further configured to at least one of:
    determine the grouping identifier for the file based on a directory in which the file is located such that files in the directory have the same grouping identifier, or
    prevent creation of references outside the directory to the directory or to the file within the directory.

11. The apparatus according to claim 9, wherein the address determination unit is further configured to:
    determine a storage address of at least one data block of the file based on the metadata of the file.

12. The apparatus according to claim 9, wherein the flagging unit is further configured to:
    set at least one bit in the grouping flag block as the flag.

13. The apparatus according to claim 9, wherein the grouping unit is further configured to:
    determine a metadata address of the file based on a mapping table comprising metadata addresses of files, and
    set the grouping identifier in the metadata of the file based on the metadata address; and wherein the flagging unit is further configured to:
set the grouping identifier for the file in the mapping table.

14. The apparatus according to claim 9, the executable units further comprising an access control unit configured to:
receive a request to access the file; and
reject the request in response to the file having the grouping identifier in a mapping table.

15. The apparatus according to claim 9, wherein the flagging unit is further configured to:
set, in response to allocating another data block of another file in the extent, another flag for the other data block in another grouping flag block of the extent corresponding to another grouping identifier of the other file; or
clear, in response to releasing a data block of the other file in the extent resulting in a released data block, the other flag for the released data block in the other grouping flag block of the extent corresponding to the other grouping identifier of the other file.

16. The apparatus according to claim 9, wherein the extent is a cylinder group of a disk.

17. A non-transitory computer-readable medium comprising machine-executable instructions which, when executed by a device comprising at least one processor, cause the device to perform operations, comprising:
setting, from a set of grouping identifiers, a grouping identifier for a file in metadata of the file based on the metadata address, wherein the setting the grouping identifier is automatically triggered based on a first criterion;
determining a storage address of a data block of the file, the storage address indicating an extent of the data block and an offset, wherein the extent is a cylinder group of a disk and comprises a storage region comprising respective grouping flag blocks for grouping identifiers of the set of grouping identifier, and wherein the cylinder group includes one or more contiguous cylinders;
setting, in a grouping flag block corresponding to the grouping identifier, a flag for the data block based on the offset, wherein setting the flag is automatically triggered based on a second criterion;
receiving a request to delete a specified file having the grouping identifier;
determining the grouping flag block of the extent corresponding to the grouping identifier;
releasing, based on the flag in the grouping flag block, a data block of the extent corresponding to the flag set in the grouping flag block; and
clearing the flag in the grouping flag block.

18. The non-transitory computer-readable medium according to claim 17, wherein the operations further comprise:
setting the grouping identifier for the file in a mapping table;
receiving a request to access the file; and
rejecting the request in response to the file being determined to have the grouping identifier in the mapping table.

19. The non-transitory computer-readable medium according to claim 17, wherein the setting of the grouping identifier for the file comprises:
determining the grouping identifier for the file based on a directory in which the file is located, with a result that files in the directory have the same grouping identifier.

20. The non-transitory computer-readable medium according to claim 17, wherein the operations further comprise:
preventing creation of references outside the directory to the directory or to any file within the directory.

* * * * *